(12) United States Patent
Hong et al.

(10) Patent No.: US 8,364,308 B2
(45) Date of Patent: Jan. 29, 2013

(54) WALKING PATTERN GENERATION SYSTEM FOR BIPED WALKING ROBOT

(75) Inventors: Seokmin Hong, Daegu (KR);
Yonghwan Oh, Seoul (KR); Doik Kim, Seoul (KR); Bumjae You, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 650 days.

(21) Appl. No.: 12/487,051

(22) Filed: Jun. 18, 2009

(65) Prior Publication Data
US 2010/0286821 A1   Nov. 11, 2010

(30) Foreign Application Priority Data

May 8, 2009 (KR) .......................... 10-2009-0040399

(51) Int. Cl.
*G06F 19/00* (2011.01)
*G05B 19/04* (2006.01)

(52) U.S. Cl. ........ 700/245; 700/248; 700/253; 700/254; 700/258; 700/260

(58) Field of Classification Search .......................... None
See application file for complete search history.

(56) References Cited

U.S. PATENT DOCUMENTS

| | | | | |
|---|---|---|---|---|
| 5,550,732 A | * | 8/1996 | Wang et al. ..................... 700/28 |
| 5,680,304 A | * | 10/1997 | Wang et al. ..................... 700/53 |
| 7,313,463 B2 | * | 12/2007 | Herr et al. ..................... 700/245 |
| 2003/0189137 A1 | * | 10/2003 | Herman ........................ 244/164 |
| 2006/0171264 A1 | * | 8/2006 | Zhou et al. .................. 369/44.27 |
| 2007/0016329 A1 | * | 1/2007 | Herr et al. ..................... 700/250 |
| 2007/0142968 A1 | * | 6/2007 | Prisco et al. .................. 700/245 |

OTHER PUBLICATIONS

J. Yamaguchi, et al., "Development of a Bipedal Humanoid Robot—Control Method of Whole Body Cooperative Dynamic Biped Walking-," Proceedings of the 1999 IEEE International Conference on Robotics & Automation, May 10-15, 1999, pp. 368-374, vol. 1.
K. Harada, et al., "An Analytical Method on Real-time Gait Planning for a Humanoid Robot," 2004 4th IEEE/RAS International Conference on Humanoid Robots, Nov. 10-12, 2004, pp. 640-655, vol. 2.
W. Yang, et al., Self-Adapting Humanoid Locomotion Using a Neural Oscillator Network, Proceedings of the IEEE International Conference on Intelligent Robotics and Systems, 2007, pp. 309-316.
Seokmin Hong, et al., "Walking Pattern Generation for Humanoid Robots with LQR and Feedforward Control Method," 34th Annual Conference of IEEE Industrial Electronics, 2008 (IECON 2008), Nov. 10-13, 2008, pp. 1698-1703.

* cited by examiner

*Primary Examiner* — Ian Jen
(74) *Attorney, Agent, or Firm* — Fenwick & West LLP

(57) ABSTRACT

A walking pattern generation system generates a walking pattern of a biped walking robot. The walking pattern generation system includes a pole-zero controller for converting a target pattern data input to the system into a reference pattern data through a first transfer function, and a walking pattern generation unit for converting the reference pattern data into a walking pattern data through a second transfer function and outputting the converted walking pattern data, wherein the second transfer function has an unstable zero, and wherein the first transfer function includes a transfer function approximated to an inverse of the unstable zero of the second transfer function.

10 Claims, 8 Drawing Sheets

WALKING PATTERN GENERATION SYSTEM FOR BIPED WALKING ROBOT

CROSS-REFERENCE TO RELATED APPLICATION

This application claims priority to Republic of Korea Patent Application No. 10-2009-0040399 filed on May 8, 2009, and all the benefits accruing therefrom under 35 U.S.C. §119(a), the contents of which in its entirety are herein incorporated by reference.

BACKGROUND

1. Field

This disclosure relates to a system for generating a walking pattern of a biped walking robot, and more particularly to a system for generating a stable walking pattern of a biped walking robot by designing the system to have a stabilized transfer function.

2. Description of the Related Art

A biped walking robot is developed for the convenience of human beings.

Biped walking robots are studied in various fields such as robot design, posture design, motion generation, walking pattern, and so on. In particular, various studies are made for systems of generating walking patterns so that a biped walking robot may walk stably without falling down.

In order to generate a walking pattern of a biped walking robot, there is known as an example a method of generating a stable walking pattern using a system of particles model and a Fourier series. However, in this method, since a motion of an upper body for stable walking is obtained by repeated procedures, it is difficult to generate a real-time walking pattern.

Also, there is known a method of generating a walking pattern using an analytical method using a trajectory of a zero moment point (ZMP) of a cubic equation. However, ZMP of a cubic equation has many limitations to satisfy both various walking step width and walking time.

SUMMARY

In one aspect, there is provided a walking pattern generation system of a robot, which ensures stable walking of the robot by converting target pattern data using a stabilized transfer function and thus generating walking pattern data required for walking of a biped walking robot.

In this aspect, there is provided a walking pattern generation system of a biped walking robot, which includes a pole-zero controller for converting a target pattern data input to the system into a reference pattern data through a first transfer function, and a walking pattern generation unit for converting the reference pattern data into a walking pattern data through a second transfer function and outputting the converted walking pattern data, wherein the second transfer function has an unstable zero, and wherein the first transfer function includes a transfer function approximated to an inverse of the unstable zero of the second transfer function.

In addition, the first transfer function may further include a transfer function that is an inverse of zero and pole of the second transfer function except for the unstable zero.

According to this disclosure, since zeros and poles of a system including unstable zeros of a transfer function of a walking pattern generation system are substantially removed, the transfer function of the system is stabilized. Thus, if a target pattern data designed for generating a stable walking pattern of a biped walking robot is input to the system, a walking pattern data substantially approximated to the target pattern data is output from the system, thereby improving the control characteristics of the robot and also ensuring stable control of actual walking of the robot.

In addition, since the walking pattern generation system is stabilized to a high level, even when a target pattern data that abruptly changes a walking path of a robot is input to the system, the walking pattern data may effectively trace it. Thus, the walking pattern generation system disclosed herein may be suitably used as a system for generating a real-time walking pattern of a robot.

BRIEF DESCRIPTION OF THE DRAWINGS

The above and other aspects, features and advantages of the disclosed exemplary embodiments will be more apparent from the following detailed description taken in conjunction with the accompanying drawings.

DETAILED DESCRIPTION

Figure 1:
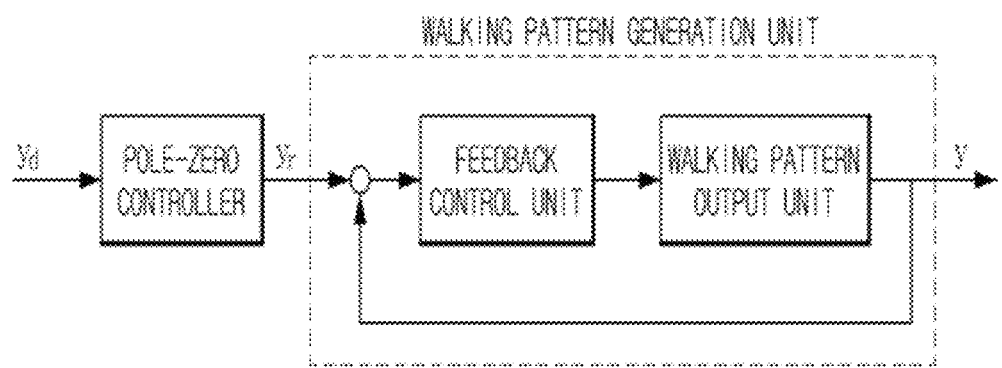
FIG. 1 is a block diagram showing a concept of one embodiment of a system disclosed herein.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements. The shape, size and regions, and the like, of the drawing may be exaggerated for clarity.

FIG. 1 is a block diagram showing a concept of one embodiment of a system disclosed herein. As shown in FIG. 1, the walking pattern generation system of this embodiment includes a pole-zero controller and a walking pattern generation unit. The pole-zero controller converts a target pattern data $y_d$ into a reference pattern data $y_r$ through a first transfer function and then transfers it to the walking pattern generation unit. The walking pattern generation unit converts the reference pattern data $y_r$ through a second transfer function to generate a walking pattern data y. In the above, the transfer function means a function having a zero and a pole, which exhibits a functional relation between an input signal input to the system and an output signal output from the system.

The output walking pattern data y is used as a walking pattern for making a humanoid robot walk. The target pattern data $y_d$ is generally designed in advance for stably controlling walking of a humanoid robot.

As shown in FIG. 1, the walking pattern generation unit of this embodiment includes a walking pattern output unit for converting an input signal and converts it as a walking pattern data y, and a feedback control unit for feedback-controlling the walking pattern output unit.

By the above configuration, the walking pattern generation unit configures a closed loop system expressed by a second transfer function.

The feedback control unit feedback-controls the walking pattern output unit to play a role of stabilizing a pole of the second transfer function of the walking pattern generation unit.

For allowing the signal converted through the walking pattern generation system to effectively trace the target pattern data $y_d$, it is required that the entire transfer function of the walking pattern generation system be a constant. In particular, in case the entire transfer function of the walking pattern generation system is approximated to 1, the output value of the system becomes substantially identical to the input value. Thus, response of the entire robot system is improved with respect to the target pattern data, and as a result the robot may walk stably.

In this embodiment, the entire transfer function of the walking pattern generation system is approximated to 1 using the pole-zero controller. Thus, the walking pattern data y is output as an approximated value substantially identical to the target pattern data $y_d$, which is the input signal.

According to this embodiment, the walking pattern data output from the walking pattern generation system is used for generating a walking pattern of the robot.

Hereinafter, configuration of the walking pattern generation system according to this embodiment is explained in detail.

Simplified Model of Biped Walking Robot

First, a simplified model of a biped walking humanoid robot is explained. In order to realize a walking pattern similar to an actual human, both legs of the humanoid robot should have at least 12 degrees of freedom. However, if the entire walking dynamic equations are used for all the degrees of freedom, very complicated calculations are needed to generate a walking pattern, which consumes a lot of time. Thus, this method is not suitable for controlling walking of a robot in real time.

Figure 2:
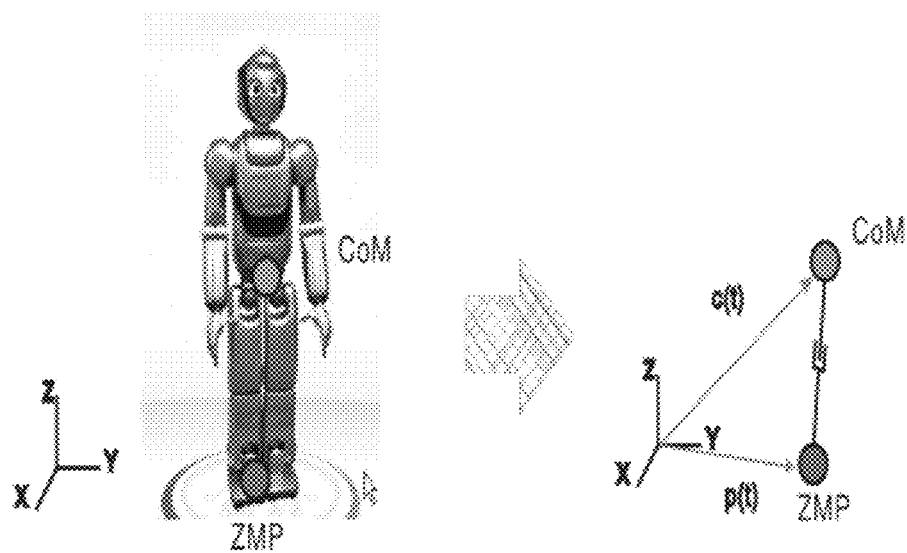
FIG. 2 is a conceptual view showing a simplified model of a humanoid robot.

To solve the above problem, in this embodiment, a simplified humanoid robot model as shown in FIG. 2 is used. FIG. 2 shows a concept of a simplified model of a humanoid robot.

According to this embodiment, as a simplified humanoid robot model, a linear inverted pendulum model (LIPM) simplified using a center of mass (CoM) and a zero moment point (ZMP) at which a moment of the robot to the ground surface is 0 is used. The ZMP represents a criterion of stabilization of the humanoid robot, and the CoM represents entire movement of the humanoid robot.

According to the LIPM, a walking dynamic equation is simplified using a ZMP and CoM of a humanoid robot simplified as a point mass, and then the simplified ZMP equation is used in calculations required for controlling the walking of the robot.

In detail, the LIPM expresses a complicated dynamic equation of a humanoid robot, which actually is a multi-object system, using a second order differential equation for CoM and ZMP. However, solving such a differential equation is very difficult since axes are coupled with each other and also non-linear components are included. Thus, in this embodiment, the LIPM is analyzed on the assumption that CoM of the robot moves on a plane with respect to the z-axis and a changing rate of an angular momentum of CoM with respect to time is very small. By means of these assumptions, the relation between the ZMP and the CoM coupled to each axis are decoupled.

Under the above assumptions, a relational expression between CoM and ZMP may be expressed by Equation 1.

$$p(t) = c(t) - \frac{1}{\omega^2}\ddot{c}(t) \qquad \text{Equation 1}$$

In Equation 1, $\omega = \sqrt{g/(Z_{COM} - Z_{ZMP})}$, wherein $Z_{COM}$, $Z_{ZMP}$ and g represent a CoM value on z-axis, a ZMP value on the z-axis and an acceleration of gravity, respectively, p(t) represents a trajectory of ZMP, and c(t) represents a trajectory of CoM.

In order to generate a walking pattern of a robot using Equation 1, the equation is converted into a state equation. An input variable u(t) and a state variable x(t) for converting Equation 1 into a state equation are defined as in Equation 2.

$$u = \frac{d}{dt}\dddot{c},$$

$$x = \begin{Bmatrix} c \\ \dot{c} \\ \ddot{c} \end{Bmatrix}$$

Equation 2

If Equation 1 is converted into a state equation using Equation 2, Equations 3 and 4 are obtained.

$$\dot{x}(t) = A^*x(t) + B^*u(t) \qquad \text{Equation 3}$$

$$y(t) = C^*x(t) \qquad \text{Equation 4}$$

In Equations 3 and 4, $$A^* = \begin{bmatrix} 0 & 1 & 0 \\ 0 & 0 & 1 \\ 0 & 0 & 0 \end{bmatrix},$$

$$B^* = \begin{Bmatrix} 0 \\ 0 \\ 1 \end{Bmatrix},$$

$$C^* = \begin{bmatrix} 1 & 0 & -\frac{1}{\omega^2} \end{bmatrix}$$

and the output y(t) exhibits a trajectory of ZMP. In other words, y(t)=p(t).

In order to process ZMP information input at regular time intervals, the state equation expressed by Equations 3 and 4 may be discretized into Equations 5 and 6.

$$x(k+1)=Ax(k)+Bu(k) \qquad \text{Equation 5}$$

$$y(k)=Cx(k) \qquad \text{Equation 6}$$

In the above equations, $$A = \begin{bmatrix} 1 & T & \frac{T^2}{2} \\ 0 & 1 & T \\ 0 & 0 & 1 \end{bmatrix},$$

$$B = \begin{Bmatrix} \frac{T^3}{6} \\ \frac{T^2}{2} \\ T \end{Bmatrix},$$

$$C = C^*$$

and T is a sampling time.

The CoM trajectory obtained using the LIPM is used for controlling actual walking movement of a humanoid robot. In detail, CoM values on the CoM trajectory are kinetically decomposed using CoM Jacobian to generate joint values of each joint axis of the robot, and the generated joint values are transferred to each joint axis and used for controlling a driving means such as motor at a corresponding portion to realize stable walking of the robot. A method for kinetically decomposing the CoM trajectory using the CoM Jacobian is beyond the scope of this disclosure, so it is not described in detail here.

In order to realize walking of a simplified humanoid robot as mentioned above, points on the ground on which a robot will step forward should be determined in advance. Considering the decided position of the robot foot, target ZMP values allowing stable walking of the robot without falling down may be calculated, and a target ZMP trajectory composed of the target ZMP values according to time may be designed in advance.

According to this embodiment, the target ZMP values on the pre-designed target ZMP trajectory are input to the system as the target pattern data. The input target ZMP values are converted through the system and then output as trace ZMP values tracing the target ZMP values. The trace ZMP values output as mentioned above generate a walking pattern of the robot.

If Equations 5 and 6, which ZMP equation of LIPM, are solved using the output trace ZMP values, it is possible to calculate CoM values that generate a walking movement of the robot. A CoM trajectory composed of the generated CoM values gives joint values used for controlling each part of the robot, as mentioned above, thereby realizing actual walking of the robot.

According to this embodiment, the target ZMP values are input to the system at regular time intervals (T). Thus, trace ZMP values are also output at regular time intervals (T). The trace ZMP values sequentially output at regular time intervals (T) generate CoM values by the discretized Equations 5 and 6 among the ZMP of the LIPM.

Design of Walking Pattern Generation Unit

Figure 3:
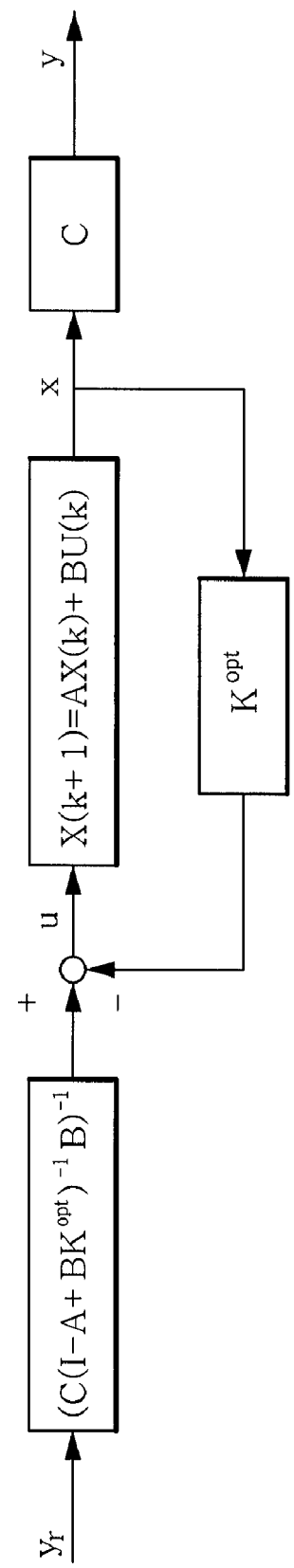
FIG. 3 is a block diagram showing one embodiment of a walking pattern generation unit disclosed herein.

FIG. 3 is a block diagram showing the walking pattern generation unit according to this embodiment. As described above, the walking pattern generation unit of this embodiment includes a walking pattern output unit for outputting a walking pattern data y using an input signal, and a feedback control unit for feedback-controlling the walking pattern output unit.

According to this embodiment, as shown in FIG. 3, the walking pattern output unit converts an input signal U into a trace ZMP value y used as a walking pattern of a robot and then outputs it. Also, the walking pattern output unit is designed to convert the trace ZMP value y into a trace CoM value x by the relations of Equations 5 and 6 and then output it. In the above unit, the output trace CoM value x is used for controlling actual walking of a robot, as mentioned above.

In other words, the walking pattern output unit is designed to output a data generating a walking pattern of a simplified robot model and then output a data required for actual walking control of the robot using the data.

The feedback control unit is used for stabilizing a pole of the transfer function of the walking pattern generation unit. A feedback control gain of the feedback control unit is selected as a value that minimizes a cost function of Equation 7.

$$\mathcal{J} = \sum_{k=0}^{\infty} \hat{x}(k)^T Q \hat{x}(k) + \hat{u}(k)^T R \hat{u}(k) \qquad \text{Equation 7}$$

In Equation 7, T represents transposition.

If $Q=C^T C$, Equation 7 may be expressed as Equation 8.

$$\mathcal{J} = \sum_{k=0}^{\infty} \hat{y}(k)^T \hat{y}(k) + \hat{u}(k)^T R \hat{u}(k) \qquad \text{Equation 8}$$

In Equation 8, $$\hat{x}(k)=x(k)-x_d(k)$$

$$\hat{u}(k)=u(k)-u_d(k)$$

$$\hat{y}(k)=y(k)-y_d(k)$$

where $y_r(k)$ is an input value input to the walking pattern generation unit.

A method for feedback-controlling a system as described above is called "linear-quadratic regulator (LQR)", and an optimal feedback control gain $K^{opt}$ may be obtained by a discrete time algebraic Riccati equation, expressed by Equation 9.

$$X=A^T XA-(A^T XB)(R+B^T XB)^{-1}(B^T XA)+Q \qquad \text{Equation 9}$$

An optimal input U may be calculated using the obtained optimal feedback control gain $K^{opt}$, as expressed by Equation 10.

$$u^{opt}(k) = -K^{opt}x(k) + (C(I - A + BK^{opt})^{-1}B)^{-1}y_r \qquad \text{Equation 10}$$

In Equation 10, $(C(I-A+BK^{opt})^{-1}B)^{-1}$ is used as a scaling factor that reduces a steady state error of a system response generated when $y_r$ is in a steady state.

The feedback control unit does not give an influence on a zero of transfer function of the walking pattern output unit and allows a pole of transfer function of the walking pattern output unit to be moved to a more stable region by means of the feedback control using the LQR method. Thus, the entire system of the walking pattern generation unit is stabilized.

Design of Pole-Zero Controller

In case the transfer function of the walking pattern generation unit is minimum-phase, the pole-zero controller is designed to have a transfer function corresponding to an inverse of the above transfer function such that the entire transfer function of the walking pattern generation system becomes 1.

However, in case the transfer function of the walking pattern generation unit is non-minimum phase having an odd number of unstable zeros, the pole-zero controller cannot be designed to have a transfer function which has inverse form of the transfer function of the walking pattern generation unit. It is because, if an inverse of the transfer function is taken as it is, the function has unstable poles, which cannot be actually realized.

By analyzing Equations 5 and 6, it would be understood that the walking pattern output unit is a non-minimum phase system including one unstable zero. Also, the feedback control unit stabilizes a pole of the control signal output unit and gives no influence on the zero of the walking pattern output unit. Thus, the walking pattern generation unit is also a non-minimum phase system having one unstable zero.

The transfer function of the walking pattern generation unit, namely the second transfer function, may be expressed as Equation 11 in the z-domain.

$$G_{closed}(z^{-1}) = \frac{z^{-d}N_s(z^{-1})N_u(z^{-1})}{D(z^{-1})} \qquad \text{Equation 11}$$

Here, $G_{closed}(Z^{-1})$ is the second transfer function, $N_s(Z^{-1})$ is a stable zero, and $N_u(Z^{-1})$ is an unstable zero.

Figure 4:
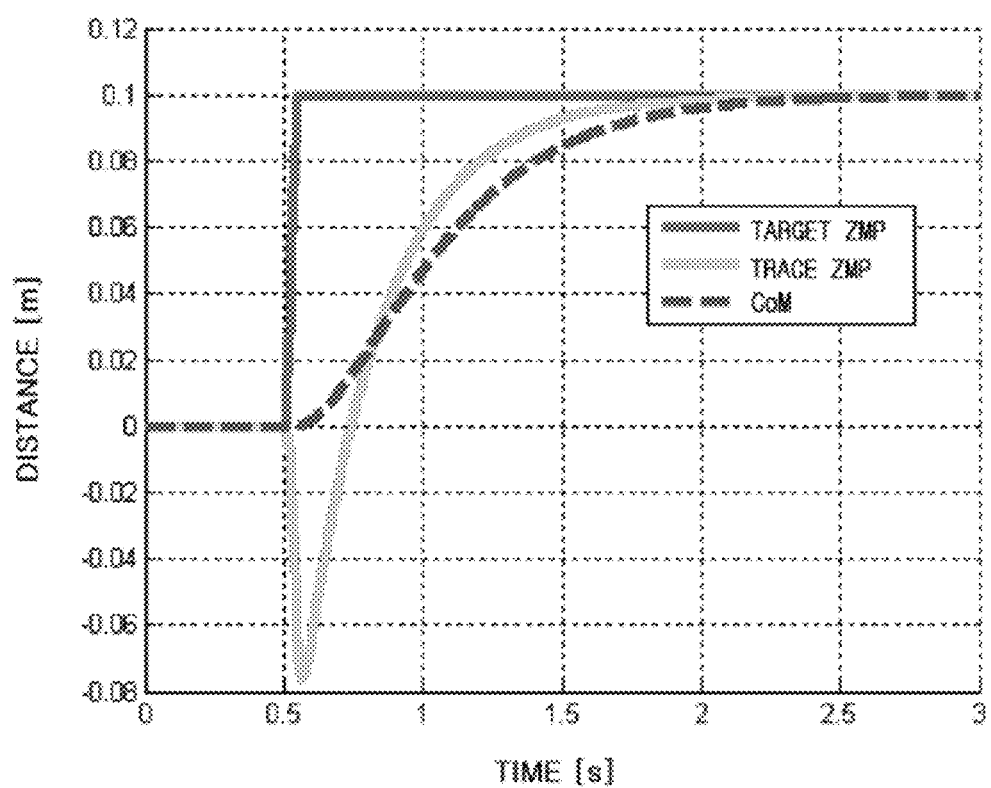
FIG. 4 is a graph showing the effect of unstable zeros in the system.

The unstable zero represents a zero in case a zero is outside a unit circle in the transfer function of the system in the z-domain. Also, due to the unstable zero, the output of the system with respect to an input of the system at an initial response is generated in an undesired direction, so the trace ZMP value that is a walking pattern data when generating a walking pattern is output with a great difference from the target ZMP value that is an input target pattern data. FIG. 4 is a graph showing the effect of an unstable zero of the system. FIG. 4 shows an effect when any separate unit is not added to the walking pattern generation unit but the target pattern data, namely the target ZMP value is input.

Referring to FIG. 4, when a target ZMP value is input to the walking pattern generation unit having an unstable zero, the trace ZMP value tracing the target ZMP value is inclined in a reverse direction, differently from the initial input at the initial response. This phenomenon makes the trace ZMP be instantly moved in a reverse direction to the target ZMP, and this phenomenon gives a bad influence on walking of the robot, in a severe case, making the robot fall down.

Thus, according to this embodiment, the system is designed to minimize an influence of an unstable zero using the pole-zero controller.

As described above, it is impossible to perfectly realize a function corresponding to an inverse of the unstable zero $N_u(Z^{-1})$, and in this embodiment, the system is designed such that the first transfer function of the pole-zero controller includes a transfer function approximated to an inverse of the unstable zero $N_u(Z^{-1})$ of the second transfer function.

Figure 5:
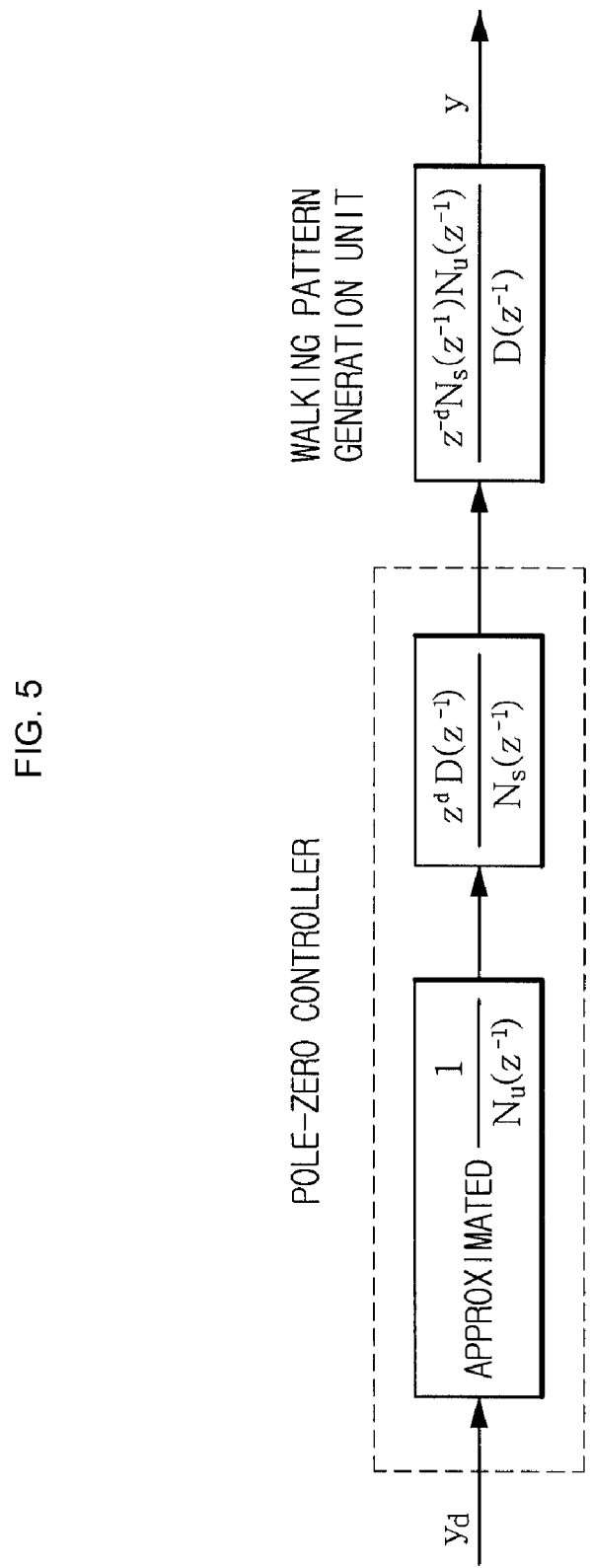
FIG. 5 is a block diagram showing the flow of a transfer function according to one embodiment of the walking pattern generation system disclosed herein.

FIG. 5 is a block diagram showing the transfer function of the walking pattern generation system according to this embodiment.

As shown in FIG. 5, the pole-zero controller of this embodiment is designed to have a first transfer function, which includes a transfer function approximated to $1/N(Z^{-1})$ and a transfer function corresponding to an inverse $Z^d D(Z^{-1})/(N_s(Z^{-1})$ of the transfer function $G_{closed}(Z^{-1})$ except for the zero point $N_u(Z^{-1})$. The first transfer function eliminates zero and pole of the second transfer function and makes the entire transfer function of the walking pattern generation system be approximated to 1.

In more detail, the transfer function approximated to $1/N_u(Z^{-1})$ included in the pole-zero controller is approximated to a series form expressed by Equations 12 or 13.

$$\frac{1}{Z - z_u} = Z^{-1} + z_u Z^{-2} + z_u^2 Z^{-2} + \ldots \quad |Z| > |z_u| \qquad \text{Equation 12}$$

$$\frac{1}{Z - z_u} = -\frac{1}{z_u} - \frac{1}{z_u^2}Z - \frac{1}{z_u^3}Z^2 + \ldots \quad |Z| < |z_u| \qquad \text{Equation 13}$$

In Equation 12 and 13, $z_u$ is an unstable zero value of the walking pattern generation unit.

In this embodiment, since $|z_u|>1$, the transfer function approximating $1/N_u(Z^{-1})$ is approximated by Equation 13.

Since Equation 13 is of an infinite summation form, it is required that the equation be approximated into a finite summation form so as to realize the approximated transfer function as a transfer function for an actual system. In this embodiment, $(n+1)$ target ZMP values from the $k^{th}$ to $k+n^{th}$ on the target ZMP trajectory are input to the pole-zero controller (k is a natural number) on the pre-designed target ZMP trajectory. Such $k+1^{th}$ to $k+n^{th}$ target ZMP values are defined as future information for the $k^{th}$ target ZMP value.

In more detail, if time T passes after the $k^{th}$ target ZMP value is input, a $k+1^{th}$ target ZMP value is input to the system. When the $k^{th}$ target ZMP value is input, the $k^{th}$ to $k+n^{th}$ target ZMP values on the target ZMP trajectory are input to the system together. After time T passes, when the $k+1^{th}$ target ZMP value is input to the system, $k+1^{th}$ to $k+n+1^{th}$ target ZMP values on the target ZMP trajectory are input to the system together. In other words, a target ZMP value and n target ZMP values to be input later than the corresponding target ZMP, namely future information, are input to the pole-zero controller.

The n future informations are used for approximating Equation 13 to $1/N_u(Z^{-1})$ corresponding to an inverse of the unstable zero in a finite summation form, and the approximated finite summation form equation may be expressed by Equation 14.

$$\sum_{n=0}^{N_{order}} -\frac{1}{z_u}\left(\frac{1}{z_u}Z\right)^n \qquad \text{Equation 14}$$

Here, $N_{order}$ is the number of future information.

Using the pole-zero controller for converting a signal by the first transfer function including an approximated transfer function like that of Equation 14, the entire transfer function of the walking control signal generation system is approximated to 1, and the entire system response is expressed as Equation 15.

$$y(k) = y_d(k) - \frac{1}{z_u^{N_{order}+1}} y_d(k + N_{order} + 1) \qquad \text{Equation 15}$$

Here, $z_u$ is an unstable zero, $N_{order}$ is the number of future information, $y(k)$ is a $k^{th}$ trace ZMP value, and $y_d(k)$ is a $k^{th}$ target ZMP value.

The second formula in the right term of Equation 15 is an error value made by approximating Equation 13 to a finite summation form as in Equation 14 using finite information.

If a system response is expressed as Equation 15, an error range of the entire system may be expected. From Equation 15, it would be understood that such a response error range of the system is decreased as the number of input future information is increased.

Figure 6:
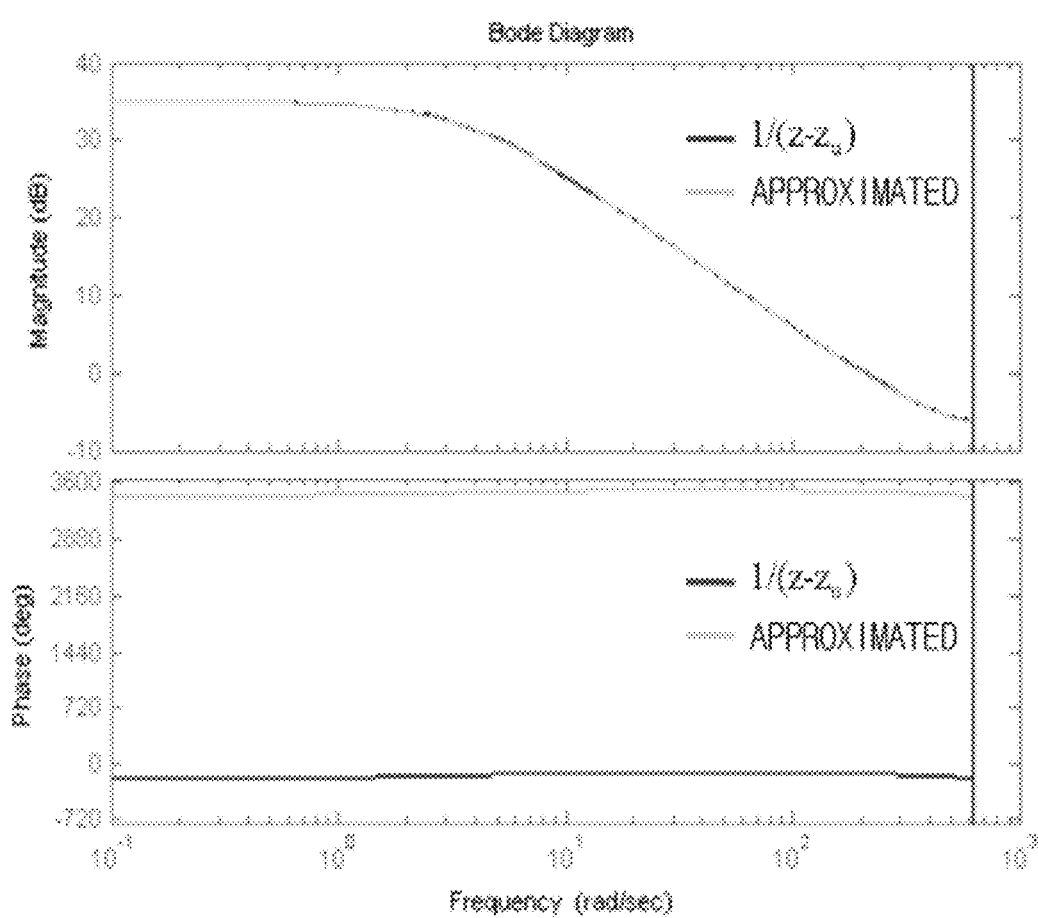
FIG. 6 is a Bode plot exhibiting the degree of approximation of the transfer function to the inverse of actual unstable zero.

FIG. 6 is a Bode plot illustrating the degree of approximation of the function approximated to Equation 14 to an inverse of an actual unstable zero $1/(z-z_u)$. The unstable zero value ($z_u$) is 1.0175, and the number of input future information is 320.

Referring to FIG. 6, it would be understood that the function approximated as Equation 14 is substantially identical to the amplitude of $1/(z-z_u)$. Although it seems that they have a very large phase difference, it does not cause any serious problem since the phase difference between two functions is $2\rho$.

Figure 7:
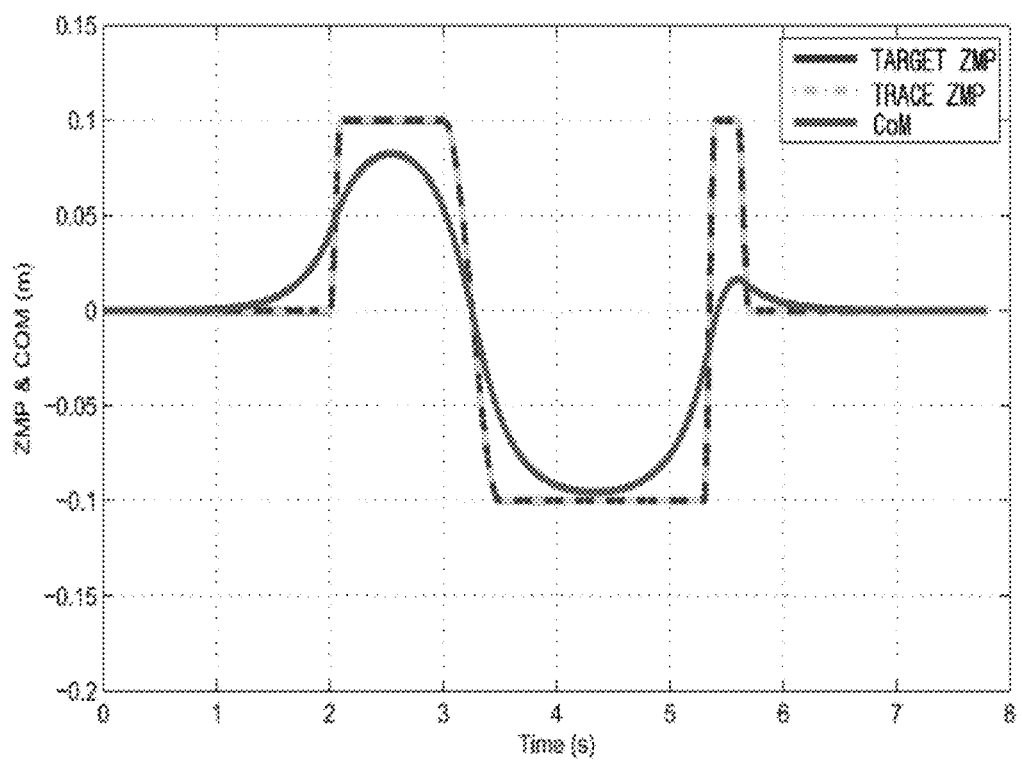
FIGS. 7, 8, and 9 are graphs showing simulation results of output characteristics, obtained after inputting in real time target zero moment point (ZMP) values to the walking pattern generation system of a robot according to one embodiment.
Figure 8:
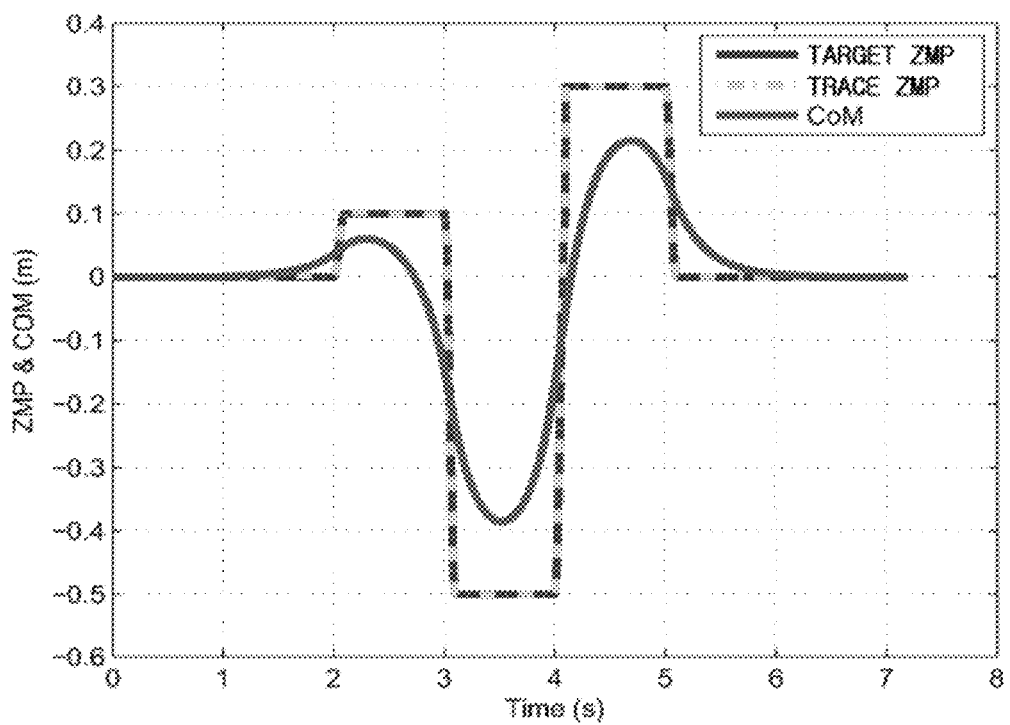
Figure 9:
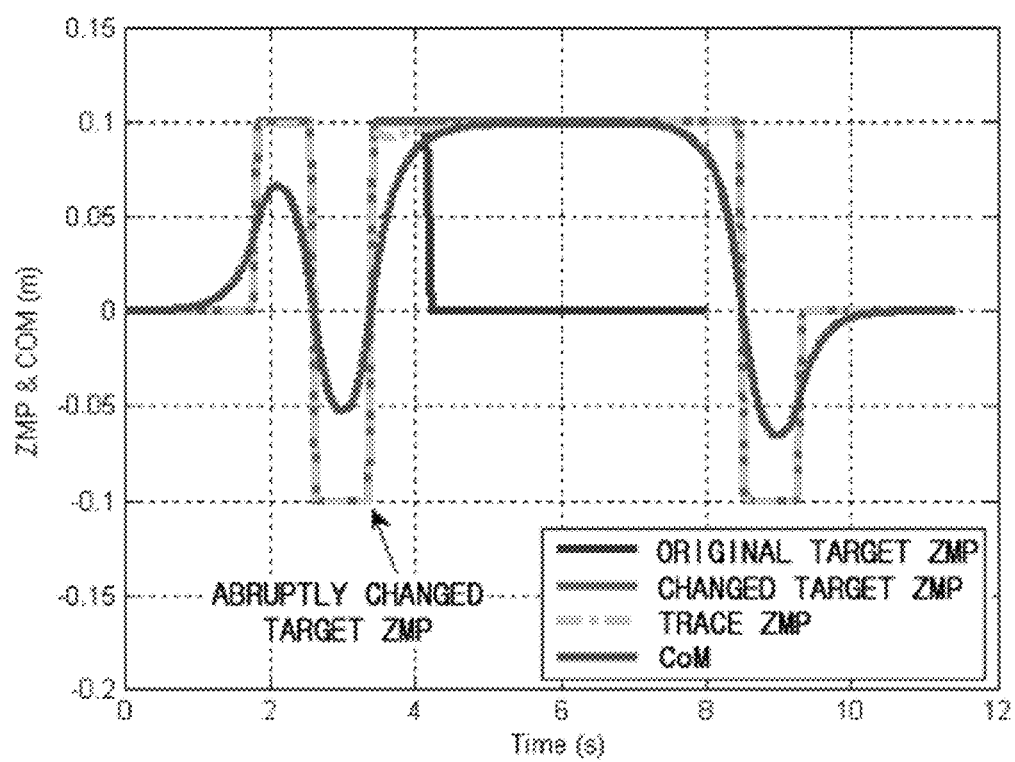

FIGS. 7 to 9 are graphs showing simulation results of output characteristics, obtained after inputting in real time target ZMP values to the walking pattern generation system of a robot according to this embodiment.

320 further informations are input to the system together with a target ZMP value, and a time interval T between inputs of a $k^{th}$ target ZMP value and a $k+1^{th}$ target ZMP value is 0.05 second.

FIG. 7 shows a simulation result after inputting target ZMP trajectory values with various walking times. FIG. 8 shows a simulation result after inputting target ZMP trajectory values that diversifies locations of the target ZMP, namely walking step widths of the robot.

As shown in FIGS. 7 and 8, with respect to the input target ZMP values, a trace ZMP value is output as a significantly approximated value, and it would be found that a CoM trajectory is accordingly connected with a smooth curve. The CoM trajectory connected with a smooth curve means that the robot walks very naturally and stably. Thus, if the walking pattern generated by the system of this embodiment is used for generating walking of a robot, the robot may walk stably for various walking step widths and walking time.

FIG. 9 is a graph showing a response characteristic of the system when the trajectory of the target ZMP values is abruptly changed. Referring to FIG. 9, even in the case where an original target ZMP trajectory is abruptly changed to another target ZMP trajectory, at about 3.35 seconds, it would be understood that trace ZMP values are output as significantly approximated values to the target ZMP value.

It is because n future informations are input in advance when $k^{th}$ data is input and thus an error range of the system is decreased. In other words, just after the target ZMP trajectory is abruptly changed as shown in FIG. 9, a target ZMP value input to the system and future information input together with the target ZMP value are corresponding to target ZMP values on a changed target ZMP trajectory.

Since the entire response characteristic of the system expressed by Equation 15 is adjusted again by the future information on a newly changed target ZMP trajectory, even when a target ZMP trajectory signal to be input is abruptly changed, it is possible to output a trace ZMP trajectory that effectively traces the changed signal. Thus, any abrupt change of input target ZMP trajectory does not give a serious influence on the stable walking pattern of the robot.

Thus, the walking pattern generation system of a robot according to this embodiment may be suitably utilized for a real-time walking control method that controls walking of a robot in real time by frequently changing input target ZMP trajectory.

While the exemplary embodiments have been shown and described, it will be understood by those skilled in the art that various changes in form and details may be made thereto without departing from the spirit and scope of this disclosure as defined by the appended claims.

In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

What is claimed is:

1. A walking pattern generation system of a biped walking robot, comprising:
    a pole-zero controller for converting a target pattern data input to the system into a reference pattern data through a first transfer function; and
    a walking pattern generation unit for converting the reference pattern data into a walking pattern data through a second transfer function and outputting the converted walking pattern data,
    wherein the second transfer function has an unstable zero,
    wherein the first transfer function includes a transfer function approximated to an inverse of the unstable zero of the second transfer function,
    wherein the walking pattern generation unit converts the converted walking pattern data into actual walking control data of the robot and outputs the actual walking control data, and
    wherein the actual walking control data is kinetically decomposed to generate joint values of each joint axis of the robot, and the generated joint values are transferred to each joint axis and used for controlling a motor at a corresponding joint axis to realize walking of the robot.

2. The walking pattern generation system of a biped walking robot according to claim 1, wherein the first transfer function further includes a transfer function that is an inverse of zero and pole of the second transfer function except for the unstable zero.

3. The walking pattern generation system of a biped walking robot according to claim 2, wherein the walking pattern generation unit includes:
    a walking pattern output unit for outputting the walking pattern data; and
    a feedback control unit for feedback-controlling the walking pattern output unit.

4. The walking pattern generation system of a biped walking robot according to claim 3, wherein an entire transfer function of the walking pattern generation system is approximated to 1 by means of the first transfer function and the second transfer function.

5. The walking pattern generation system of a biped walking robot according to claim 4,
wherein the walking pattern is a trajectory formed by a zero moment point (or, a target ZMP trajectory) to a ground surface,
wherein the target pattern data is a target ZMP value on a pre-designed ZMP trajectory, and
wherein the walking pattern data is a trace ZMP value that traces the target ZMP value.

6. The walking pattern generation system of a biped walking robot according to claim 5, wherein the target ZMP value is input at regular time intervals (T).

7. The walking pattern generation system of a biped walking robot according to claim 6,
wherein the second transfer function includes one unstable zero, and
wherein the transfer function included in the first transfer function, which is approximated to an inverse of the unstable zero of the second transfer function, is expressed by Equation 13:

$$\frac{1}{Z-z_u} = -\frac{1}{z_u} - \frac{1}{z_u^2}Z - \frac{1}{z_u^3}Z^2 + \ldots \quad |Z| < |z_u| \qquad \text{Equation 13}$$

where $z_u$ is an unstable zero value of the walking pattern generation unit.

8. The walking pattern generation system of a biped walking robot according to claim 7,
wherein, when a $k^{th}$ target ZMP value on the target ZMP trajectory is input to the system, (n+1) target ZMP values from $k^{th}$ to $k+n^{th}$ on the target ZMP trajectory are input together to the pole-zero controller, where k is a natural number and n is a natural number greater than 1,
whereby a $k^{th}$ trace ZMP value is output.

9. The walking pattern generation system of a biped walking robot according to claim 8, wherein the $k^{th}$ target ZMP value and the $k^{th}$ trace ZMP satisfy Equation 15:

$$y(k) = y_d(k) - \frac{1}{z_u^{N_{order}+1}} y_d(k + N_{order} + 1) \qquad \text{Equation 15}$$

wherein $z_u$ is an unstable zero, $N_{order}$ is the number of future information, y(k) is a $k^{th}$ trace ZMP value, and $y_d(k)$ is a $k^{th}$ target ZMP value.

10. The walking pattern generation system of a biped walking robot according to claim 9,
wherein the walking of the robot is controlled using a center of mass (CoM) value of the robot, and
wherein the walking pattern output unit converts the trace ZMP value to a trace CoM value by means of Equations 5 and 6, and then outputs the converted trace CoM value:

$$x(k+1) = Ax(k) + Bu(k) \qquad \text{Equation 5}$$

$$y(k) = Cx(k) \qquad \text{Equation 6}$$

wherein $$A = \begin{bmatrix} 1 & T & \frac{T^2}{2} \\ 0 & 1 & T \\ 0 & 0 & 1 \end{bmatrix},$$

$$B = \begin{Bmatrix} \frac{T^3}{6} \\ \frac{T^2}{2} \\ T \end{Bmatrix},$$

$$C = C^*$$

and wherein T is a time difference between a $k^{th}$ signal and a $k+1^{th}$ data;
y(k) is a $k^{th}$ trace ZMP value;
x(k) is a $k^{th}$ trace CoM value; and
u(k) is an input value input to the walking pattern output unit.

* * * * *